United States Patent [19]

Mabuchi

[11] Patent Number: 4,789,973
[45] Date of Patent: Dec. 6, 1988

[54] RECORDING/REPRODUCING APPARATUS WITH DUAL DISPLAY CAPABILITY

[75] Inventor: Toshiaki Mabuchi, Tokyo, Japan

[73] Assignee: Canon Kabushiki Kaisha, Tokyo, Japan

[21] Appl. No.: 898,324

[22] Filed: Aug. 20, 1986

[30] Foreign Application Priority Data

Aug. 22, 1985 [JP] Japan .................. 60-184596[U]
Aug. 22, 1985 [JP] Japan .................. 60-128317[U]

[51] Int. Cl.$^4$ .................................. G11B 31/00
[52] U.S. Cl. ............................. 369/24; 360/137
[58] Field of Search ............ 360/33.1, 137; 358/906; 369/24

[56] References Cited

U.S. PATENT DOCUMENTS

| | | | |
|---|---|---|---|
| 2,036,171 | 3/1936 | Fox | 369/24 |
| 3,823,388 | 7/1974 | Chadima, Jr. et al. | 360/4 |
| 3,956,740 | 5/1976 | Jones et al. | 360/4 |
| 4,388,712 | 6/1983 | Timm | 360/137 |
| 4,450,487 | 5/1984 | Koide | 358/906 |
| 4,614,861 | 9/1986 | Pavlov et al. | 235/381 |

OTHER PUBLICATIONS

Blaupunkt advertisement in *High Fidelity*, Nov. 1981, p. 82.
Blaupunkt brochure #401225 887, Robert Bosch Corporation, Broadview, Ill.

*Primary Examiner*—Raymond F. Cardillo
*Assistant Examiner*—David L. Robertson
*Attorney, Agent, or Firm*—Robin, Blecker & Daley

[57] ABSTRACT

A system for recording and reproducing includes a first instruction and display device, a second instruction and display device separably electrically connected with the first such device and sensing apparatus for detecting whether the second device is connected to or disconnected from the first device. A recording/reproducing controller is operably responsive to instructions generated by the devices to operate a recorder/reproducer unit and is dependent on the sensing apparatus for controlling the displays of the first and second devices. In a VTR application, the first device is included in the body of the VTR and the second device is a remote controller. The sensing apparatus detects when the remote controller is operatively connected to the VTR and the controller provides for activation of the display of the remote controller under such condition.

16 Claims, 4 Drawing Sheets

FIG.5

| OPERATION MODE | DISPLAY |
|---|---|
| STOP | □ |
| REWINDING | ◁◁ |
| FAST FEEDING | ▷▷ |
| RECORDING | ▷ ○ |
| REPRODUCTION | ▷ |
| PAUSE OF RECORDING | ◫ ○ |
| STILL PICTURE REPRODUCTION | ◫▷ |
| REVERSE REPRODUCTION | ◁ |

RECORDING/REPRODUCING APPARATUS WITH DUAL DISPLAY CAPABILITY

BACKGROUND OF THE INVENTION

1. Field of the Invention

This invention relates to a recording or reproducing system which records or reproduces information.

2. Description of the Related Art

In carrying out a remote information recording or reproducing operation on a recording or reproducing system such as a VTR by means of a remote control device, it has heretofore been known that the state of a recording or reproducing operation being performed by the VTR in response to the remote control device is confirmed by means of a display device disposed at the main body of the VTR.

However, with the display device located at the main body of the VTR as mentioned above, it is difficult to see the display in cases where a recording or reproducing operation is performed on the system by the remote control device. For confirmation of the operation, therefore, the operator must approach the system body to observe the display. This has lessened the advantage attainable by the remote control arrangement.

Meanwhile, a display part has been provided on the keys of a detachable operation part. In accordance with this arrangement, the operating state of the VTR is displayed by illuminating and extinguishing display elements such as LED's mounted on the operation keys of the removable operation part. However, the body of the VTR has come to be arranged in a smaller size than before. As a result, the detachable operation part which has the above-stated operation keys also has come to be of a reduced size, which makes it difficult to mount the display elements on the operation keys. Besides, it is not desirable to make a display with such elements as LED's in terms of electrical energy saving.

In a conceivable solution of this problem, liquid crystal display elements are used for a concentrated display of the operating state of the VTR. Meanwhile, however, the number of different operation modes of a VTR has been increased. Accordingly, the number of display elements must be increased. This necessitates a complex arrangement of the display part. Then, the size of the display part increases to result in an increase in the size of the detachable operation part and in the degradation of the operability of the detachable operation part. In addition to that, this solution is disadvantageous in terms of reduction in size of the VTR.

SUMMARY OF THE INVENTION

It is a general object of this invention to provide a recording or reproducing system which is capable of solving the above-stated problems of the prior art.

It is a more specific object of this invention to provide a recording or reproducing system which is capable of reliably permitting confirmation of the operating state of the system at a distance from the main body of the system.

Under this object, a recording or reproducing system arranged according to this invention to record information on a recording medium or to reproduce information from a recording medium on which the information is recorded comprises: recording or reproducing means for recording information on a recording medium or for reproducing information from a recording medium on which the information is recorded; operation control means for controlling the operation of the recording or reproducing means; first instruction means for instructing the operation control means to perform a control operation; first display means arranged to be capable of making a display corresponding to a state of operation performed by the recording or reproducing means according to the instruction of the first instruction means; second instruction means for instructing, from a location remote from the first instruction means, the operation control means to perform a control operation; second display means arranged to be capable of making a display corresponding to a state of operation performed by the recording or reproducing means according to the instruction of the second instruction means; and display control means arranged to cause at least the second display means to make a display corresponding to the operating state of the recording or reproducing means when the second instruction means instructs the operation control means to perform a control operation.

It is another object of this invention to provide a recording or reproducing system which is arranged to facilitate reduction in size thereof and has improved operability.

Under that object, a recording or reproducing system arranged as another embodiment of this invention to record information on a recording medium or to reproduce information from a recording medium on which the information is recorded comprises: recording or reproducing means for recording information on a recording medium or for reproducing information from a recording medium on which the information is recorded; operation control means for controlling the operation of the recording or reproducing means; first instruction means for instructing the operation control means to perform a control operation; first display means for making a display corresponding to a state of operation performed by said recording or reproducing means in accordance with the instruction of the first instruction means when the first instruction means instructs the operation control means to operate; second instruction means for instructing, from a location remote from the first instruction means, the operation control means to perform a control.operation; and second display means arranged to make a display corresponding to a state of operation performed by the recording or reproducing means according to the instruction of the second instruction means when the instruction for an operation is given from the second instruction means to the operation control means.

It is a further object of this invention to provide a recording or reproducing system which is arranged to permit reduction in cost and size of the system by virtue of its simple structural arrangement and is capable of clearly displaying the operating state thereof despite a low rate of electric energy consumption.

Under this object, a recording or reproducing system arranged as a further embodiment of this invention to record information signals on a tape-shaped recording medium or to reproduce information signals from a tape-shaped recording medium on which the information signals are recorded comprises: driving means for driving said tape-shaped recording medium which is arranged to be longitudinally movable; moving speed control means for controlling a moving speed at which the tape-shaped recording medium is moved by the driving means; first display means which is capable of emitting a light and is arranged in a visually discernible shape to indicate the moving direction of the tape-shaped recording medium; second display means which is disposed in the neighborhood of the first display means and is arranged to be in the same shape as the first display means and to be capable of emitting a light; and display control means arranged to cause the first display means to light up when the moving speed control means is controlling the driving means to cause the tape-shaped recording medium to be moved at a first speed and to cause both the first and second display means to light up when the moving speed control means is controlling the driving means to cause the tape-shaped recording medium to be moved at a second speed which is faster than the first speed.

Further objects and features of this invention will become apparent from the following detailed description of embodiments thereof taken in connection with the accompanying drawings.

BRIEF DESCRIPTION OF THE DRAWINGS

FIG. 5 shows displays to be made according to this invention for indicating various operation modes of a VTR embodying this invention.

DETAILED DESCRIPTION OF THE PREFERRED EMBODIMENT

Figure 1:
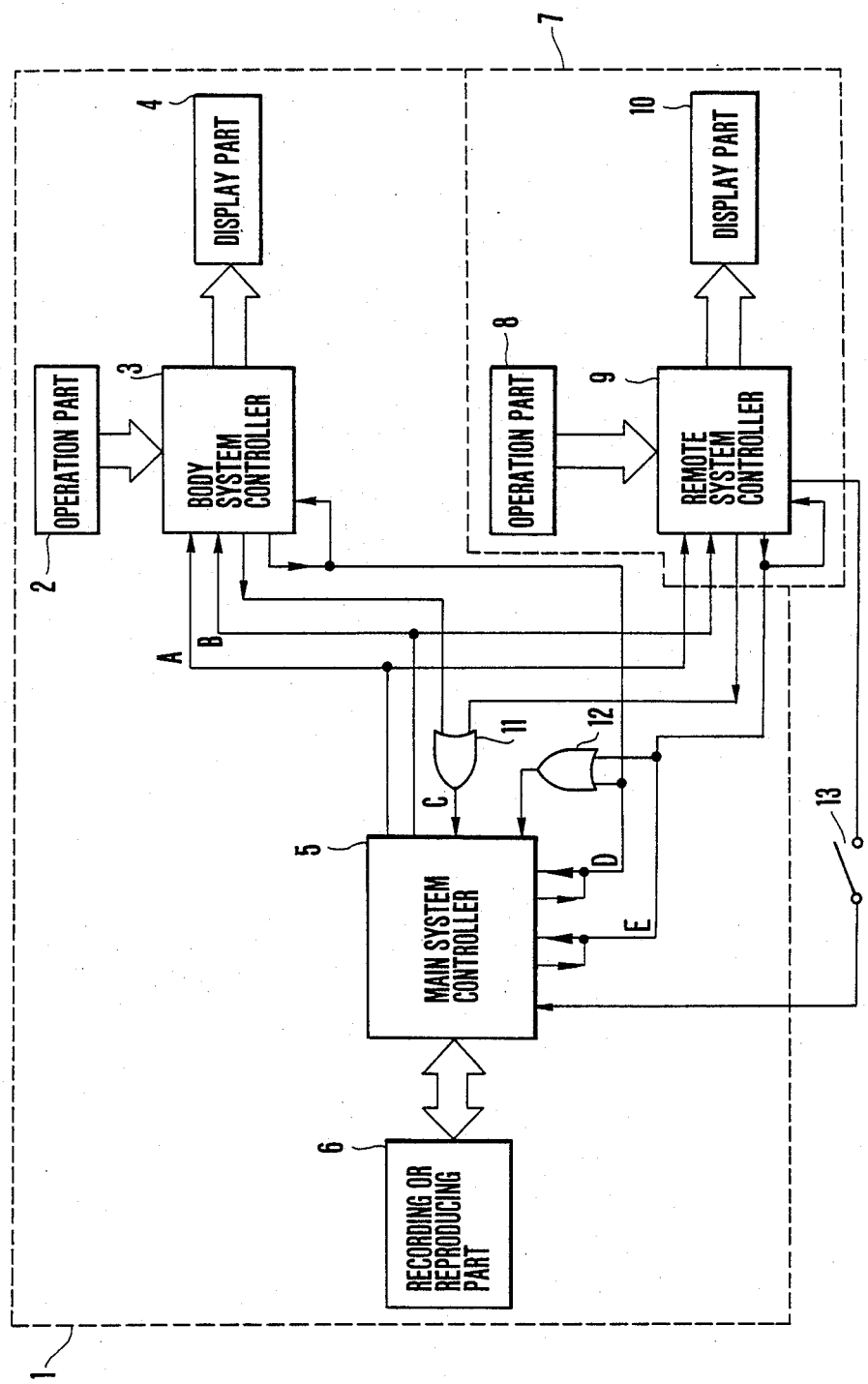
FIG. 1 is a diagram showing in outline the arrangement of a VTR to which this invention is applied.

In the case of the following description of an embodiment, this invention is applied to a VTR;, FIG. 1 shows in outline the arrangement of the VTR. The illustration includes the body 1 of the VTR; an operation part 2 arranged on the body 1 to permit an operation for starting a recording or reproducing operation; a body system controller 3 which is arranged to produce and supply an operation instructing signal C to a main system controller 5 in response to an operation performed on the operation part 2 disposed on the body 1 and to cause a display part 4 disposed on the body to make a display in accordance with a display instruction signal B received from the main system controller 5; and the display part 4 which is disposed on the body 1 and is arranged to be under the control of the system controller 3 disposed on the body 1. The main system controller 5 is arranged to produce a clock pulse signal A; to produce a display instruction signal B indicative of the operating state of a recording or reproducing part; to control the recording or reproducing part 6 according to an operation instructing signal C produced either from the above-stated body system controller 3 or from another system controller 9 which is remotely disposed; and to control exchange of various instruction signals between the system contollers 5 and 9 which are disposed on the body and at a remote location respectively. The recording or reproducing part 6 is arranged at the body of the VTR to perform recording or reproduction. A reference numeral 7 denotes a remote control part; and a numeral 8 denotes a remote operation part provided for causing the VTR body 1 to begin to record or from remote control part 7. The remote system controller 9 is arranged to produce and supply the operation instructing signal C to the main system controller 5 in accordance with an operation performed on the remote operation part 8 and to cause a remote display part 10 to make a display in accordance with a display instruction signal B produced from the main system controller. The remote display part 10 is under the control of the remote system controller 9. Numerals 11 and 12 denote OR gates. A numeral 13 denotes a switch which is arranged to close (be in ON state) when the remote control part 7 is connected to the body 1.

When the remote control part 7 is not connected to body 1, an operation for recording or reproduction and a display of a recording or reproducing state are performed at the operation part 2 of the body and is shown on the display part 4 disposed on the body respectively. When the remote control part 7 is not connected to the body 1, the switch 13 is open and thus in OFF state. With this condition detected by the main system controller 5, transmission completion signals are exchanged between the main system controller 5 and the system controller 3 of the body through a line D shown in FIG. 1. More specifically, when a recording, reproducing or fast feeding, rewinding, pause or slow feeding operation, or the like is designated at the operation part 2 of the body, a transmission confirmation signal is produced from the system controller 3 of the body to the main system controller 5 via the OR gate 12. This signal interrupts the main system controller 5 to make it ready for receiving the operation instructing signal C. Then, a transmission confirming signal is supplied from the main system controller 5 to the system controller 3 of the body to inform the latter that the former has become ready for receiving a signal. After this, the system controller 3 on the side of the body produces the operation instructing signal C according to the above-stated designation. The signal C is supplied via the OR gate 11 to the main system controller 5. After receipt of the signal C, the main system controller 5 checks and confirms the operating state of the recording or reproducing part 6 and then causes the recording or reproducing part 6 to perform an operation according to the operation instructing signal. Then, at this time, a transmission confirming signal is supplied from the main system controller 5 via the line D to the system controller 3 of the body 1. This signal interrupts the latter system controller 3 to make it ready for receiving a signal. The system controller 3 then supplies a transmission confirming signal to the main system controller 5 through the line D. Following this, the main system controller 5 supplies the system controller 3 with a display instruction signal B for making a display corresponding to the operating state of the recording or reproducing part 6. Upon receipt of that signal, the controller 3 causes the display part 4 of the body 1 to make a display of the operating state accordingly.

When the remote control part 7 is connected to the body, the embodiment operates as described below with reference to the flow chart of FIG. 2.

Figure 2:
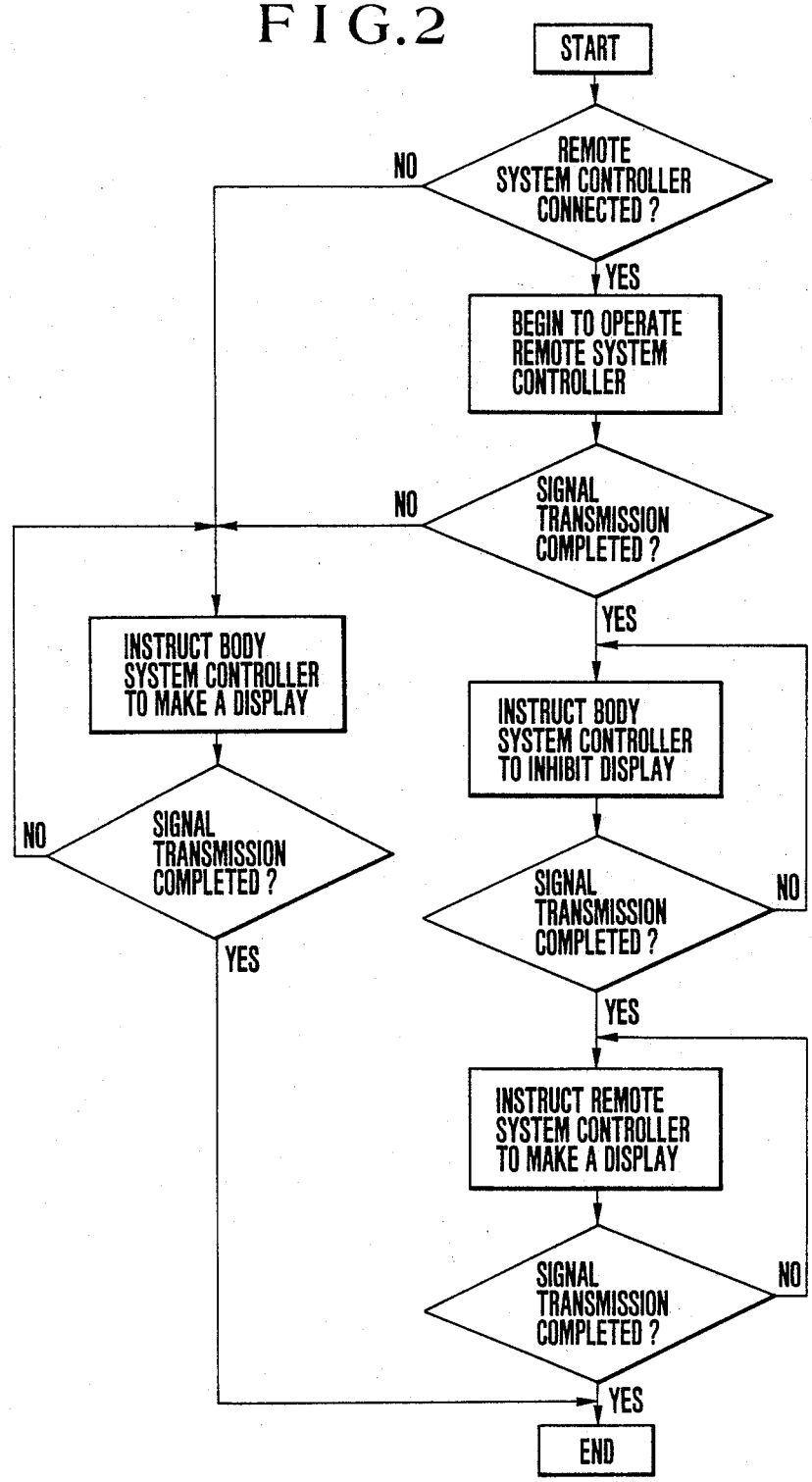
FIG. 2 is a flow chart showing the operation of the embodiment shown in FIG. 1.

Referring to FIG. 2, the main system controller 5 begins to operate and checks the switch 13 to see if it is in an ON state. If the switch 13 is found not ON, the remote control part 7 is considered not connected. Then, the system controller 3 which is disposed on the body operates in the manner as described in the foregoing. If the switch 13 is found to be in an ON state, the remote control part 7 is considered to have been connected. In that case, a transmission confirming signal is supplied from the main system controller 5 to the system controller 9 of the remote control part 7 via a line E. After that, when the remote system controller 9 becomes operative, a transmission confirming signal is supplied from the controller 9 to the main system controller 5. Then, instructions for operations and displays come to be produced and shown at the remote control part 7. In the event of an abnormality that the transmission confirming signal produced from the remote system controller 9 is not obtained, the remote control part 7 is considered to be out of order and the use of the remote control part is shifted to an operation by the system controller 3 disposed on the side of the body. In the case of a normal condition, transmission confirming signals are exchanged via the line D. Then, after completion of an interruption process thus accomplished, the main system controller 5 produces and supplies an operation instructing signal B to the system controller 3 of the body for bringing a display operation to an end. While the display operation of the system controller 3 thus can be brought to a stop, the system can be instructed to operate by operating the operation part 2 disposed on the side of the body. Further, the display part 4 of the body is restrained from making a display under a normal condition. However, the display part 4 may be arranged to make a display required for confirmation of a connected state of the remote control part 7.

With the display part 4 on the side of the body thus restrained from making a display, an instruction for operation by the remote operation part 8 and an operation display by the remote display part 10 are performed at the remote control part 7 under the control of the remote system controller 9 through the exchange of transmission confirming signals between the main system controller 5 and the remote system controller 9 via the line E. The system controller 3 on the body and the remote system controller 9 are arranged to operate in the same manner. Therefore, the operation of the remote control part 7 is similar to the operation described in the foregoing. The system controllers on the side of the system body and on the side of the remote control part may be of the same kind in this case. Therefore, the operation parts and the display parts on both sides can be arranged in the same manner. More specifically, the remote display part 10 can be arranged to display information on the presence or absence of a tape cassette; the result of a battery check; a bedewed state of a cylinder; the counted value of a counter; etc.

Figure 3:
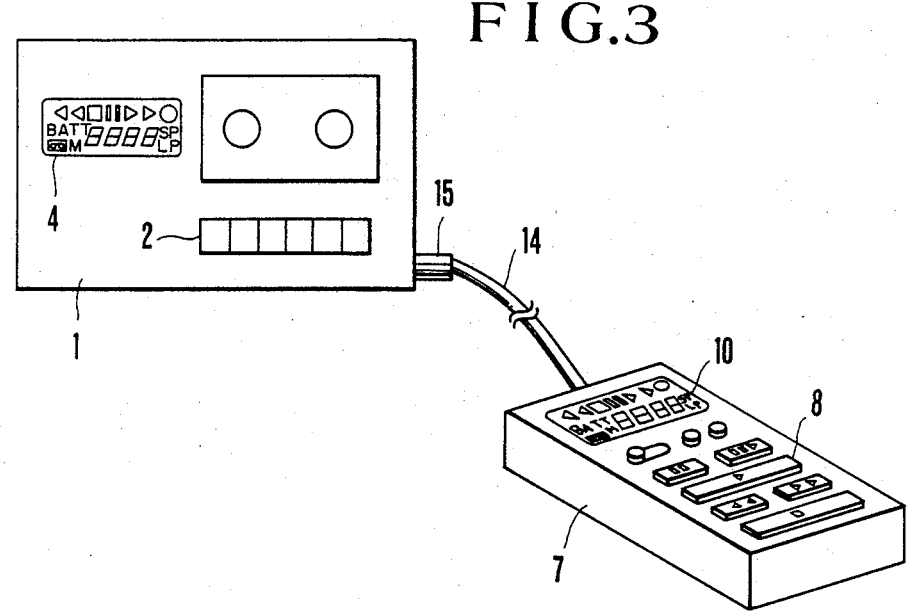
FIG. 3 is an illustration showing a VTR to which this invention is applied as in a state of being connected to a remote control device.

FIG. 3 shows the VTR embodying this invention and a remote control part as in an interconnected state. The above-stated switch 13 is disposed at a connector 15 of a multi-cable 14 connecting the remote control part 7 to the VTR body 1. The operation of the system can be facilitated by arranging the switch 13 to turn on when the connector 15 is connected. The wired connection arrangement as shown in FIG. 3 may be replaced with some wireless arrangement in accordance with this invention. In that instance, the operation and a display by the remote control part is arranged to begin upon receipt of a predetermined signal or light generated by the remote control part.

In the specific embodiment described, this invention is applied by way of example to a VTR. However, in accordance with this invention, the operability of any system that performs a remote operation and is arranged to display the operating state of the main body of the system, such as a video disc recording or reproducing system or the like can be improved to a great degree.

As described in the foregoing, the recording or reproducing system according to this invention enables the operator of the system without difficulty to carry out remote recording or reproduction while confirming the actual operating state of the main part of the system without viewing the main part.

Figure 4:
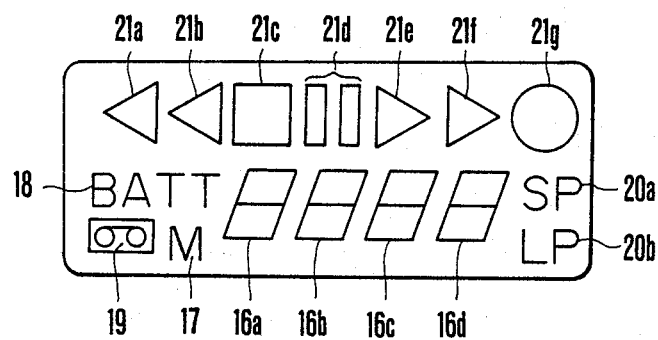
FIG. 4 is an illustration showing a display part arranged according to this invention.

An example of the details of the display part employed in a recording or reproducing system embodying this invention is as described below:

FIG. 4 shows this example of the display part. Each of numerical display elements 16a, 16b, 16c and 16d consists of seven segments. They jointly serve as a tape counter. An element 17 is arranged to make a counter memory display. A battery warning display element 18 is arranged to flicker when the voltage of a battery becomes lower than a given level. A display element 19 is arranged to flicker when the remaining amount of a tape in use becomes less than a given amount. Display elements 20a and 20b are arranged to show whether the recording track pitch (a tape speed) at which recording or reproduction is performed by the VTR is the pitch of a standard play (SP) mode or a narrower pitch for a long-time play (LP) mode.

Display elements 21a, 21b, 21c, 21d, 21e, 21f and 21g are arranged to show the operation modes of the system. The details of the operation mode displays are as shown in FIG. 5. Referring to FIG. 5, the element 21e is arranged to light up during recording or reproduction performed by allowing the tape to travel forward at a given speed and also when the tape is allowed to travel forward at a high speed for fast feeding. The element 21b is arranged to light up when the tape is allowed to travel backward at a given speed and also when the tape is allowed to travel backward at a high speed for rewinding. This arrangement permits use of the elements 21b and 21e for two operation modes in which the tape is allowed to travel at different speeds respectively.

The elements 21e and 21f are caused to flicker during the so-called fast feeding reproduction. The elements 21a and 21b are caused to flicker during reverse reproduction. A discrimination thus can be made between fast feeding and rewinding by this arrangement.

Designation for each of these operation modes is made by means of the operation part 2 or 8 shown in FIG. 1. The data thus produced at the operation part is supplied either to the system controller 3 disposed on the side of the system body or to the remote system controller 9. Then, after confirmation of that the recording or reproducing part 6 has assumed the designated operation mode, the confirmation data thus obtained is supplied either to the system controller 3 or to the remote system controller 9. Upon receipt of the data, the system controller 3 or 9 causes the display part 4 or 10 to make a display corresponding to the above-stated designation data. The display elements 21a to 21g are individually drivable so that various displays can be made as shown in FIG. 5.

In the display device described, the pair of elements 21a and 21b and another pair of elements 21e and 21f are arranged in the same shape with each pair arranged close together and to be individually illuminated. This arrangement gives readily discernible displays within a limited space. The compact display part can be readily mounted not only on the system body but also on the remote control part.

The recording or reproducing system embodying this invention, as described in the foregoing, is capable of making concentrated, readily discernible displays of various operation modes of the system within the compact display part.

What is claimed is:

1. A recording or reproducing system for recording information on a recording medium or for reproducing information from a recording medium on which said information is recorded, comprising:
    (a) recording or reproducing means for recording means for recording information on a recording medium or for reproducing information from a recording medium on which said information is recorded;
    (b) operation control means for controlling the operation of said recording or reproducing means; a first unit having
    (c) first instruction means for instructing said operation control means to perform a control operation; and
    (d) first display means for making a display corresponding to a state of operation performed by said recording or reproducing means according to the instruction of said first instruction means; a second unit for electrical connection to and disconnection from said first unit, said second unit having
    (e) second instruction means for instructing said operation control means to perform a control operation; and
    (f) second display means for making a display corresponding to a state of operation performed by said recording or reproducing means according to the instruction of said second instruction means; said system further including
    (g) sensing means for sensing connection or disconnection of said first and second units; and
    (h) display control means operably responsive to said sensing means for controlling at least said second display means to present a display corresponding to the operating state of said recording or reproducing means corresponding to the instruction of said second instruction means when said sensing means senses connection of said first and second unit.

2. A system according to claim 1, wherein said operation control means includes a display signal generating circuit for generating a disply signal corresponding to the operation being performed by said recording or reproducing means.

3. A system according to claim 2, wherein said display control means supplies said second display means with said display signal generated by said display signal generating circuit.

4. A recording or reproducing system for recording information on a recording medium or for reproducing information from a recording medium on which said information is recorded, comprising:
    (a) recording or reproducing means for recording information on a recording medium or for reproducing information from a recording medium on which said information is recorded;
    (b) operation control means for controlling the operation of said recording or reproducing means; a first unit having
    (c) first instruction means for instructing said operation control means to perform a control operation; and
    (d) first display means for making a display corresponding to a state of operation performed by said recording or reproducing means in accordance with the instruction of said first instruction means;
    a second unit physically movable relative to said first unit for remote location with respect thereto, said second unit having
    (e) second instruction means for instructing, from a distance farther than said first instruction means, said operation control means to perform a control operation; and
    (f) second display means arranged to make a display corresponding to a state of operation performed by said recording or reproducing means according to the instruction of said second instruction means when the instruction for an operation is given from said second instruction means to said operation control means said operation control means being operable further for controlling said first and second display means for selective display by said first display means and not by said second display means.

5. A system according to claim 4, wherein said operation control means includes a display signal generating circuit for generating a display signal corresponding to the operation of said recording or reproducing means.

6. A system according to claim 5, wherein said operation control means includes an output selection circuit to selectively supply said display signal generated by said display signal generating circuit either to said first display means or to said second display means.

7. A system according to claim 6, wherein said output selection circuit supplies said display signal generated by said display signal generating circuit selectively to said first display means when an instruction for an operation is produced from said first instruction means and to supply said display signal to said second display means when an instruction for an operation is produced from said second instruction means.

8. A recording or reproducing system for recording information on a recording medium or for reproducing information from a recording medium on which said information is recorded, comprising:
    (A) a recording or reproducing device including:
        (a) recording or reproducing means for recording information on a recording medium or for reproducing information from a recording medium on which said information is recorded;
        (b) operation control means for controlling the operation of said recording or reproducing means;
        (c) first instruction means for instructing said operation control means to perform a control operation; and
        (d) first display means for presenting a display corresponding to a state of operation perfored by said recording or reproducing means according to the instruction of said first instruction means;
    (B) a remote operation device for connection to and disconnection from said recording or reproducing device, said remote operation device including:
        (e) second instruction means for instructing said operation control means to perform a control operation; and
    (C) second display means for presenting a display corresponding to a state of operation performed by said recording or reproducing means according to the instruction of said second instruction means; said system further including
    (D) sensing means for sensing connection or disconnection of said remote operation device and said recording or reproducing device; and (E) display control means operably responsive to said sensing means for controlling at least said second display means to present a display corresponding to the operating state of said recording or reproducing means corresponding to the instruction of said second instruction means when said sensing means senses connection of said remote operation device and said recording or reproducing device.

9. A system according to claim 8, wherein said operation control means includes a display signal generating circuit which generates a display signal corresponding to the operation of said recording or reproducing means.

10. A system according to claim 9, wherein said display control means supplies said second display means with said display signal generated by said display signal generating circuit.

11. A system according to claim 9, wherein said recording or reproducing device further includes instruction discriminating means for detecting whether or not an instruction for an operation is received from said second instruction means from said operation control means.

12. A system according to claim 11, wherein said display control means includes a supply circuit to supply said display signal generated by said display signal generating circuit to said second display means.

13. A system according to claim 12, wherein said remote operation device further includes transmission means to electrically connect said second instruction means and said operation control means to each other to enable the instruction of said second instruction means for an operation to be transmitted to said operation control means; and said instruction discriminating means is arranged to determine that the operating instruction has been given from said second instruction means to said operation control means.

14. A system according to claim 12, where said second instruction means includes an operation part to instruct said recording or reproducing means to operate and an instruction signal generating circuit which generates an instruction signal corresponding to the operating instruction produced from said operation part; and said remote operation device further includes an output cable for providing said instruction signal generated by said instruction signal generating circuit.

15. A system according to claim 14, wherein said recording or reproducing device further includes a connector to electrically interconnect said second instruction means and said operation control means when said output cable is mechanically connected to said connector.

16. A system according to claim 15, wherein said instruction discriminating means is operative to determine that said operating instruction has been received from said second instruction means by said operation control means when said output cable is mechanically connected to said connector.

* * * * *